United States Patent [19]
Cummings

[11] 3,869,199
[45] Mar. 4, 1975

[54] SOLAR ENERGY ABSORBER
[75] Inventor: Richard D. Cummings, Reading, Mass.
[73] Assignee: Itek Corporation, Lexington, Mass.
[22] Filed: Dec. 13, 1973
[21] Appl. No.: 424,589

[52] U.S. Cl.............. 350/293, 126/270, 350/299
[51] Int. Cl. .......................................... G02b 5/10
[58] Field of Search ............ 126/270, 271; 350/288, 350/293, 294, 299, 310, 199

[56] References Cited
UNITED STATES PATENTS
980,505   1/1911   Emmet.............................. 126/271

Primary Examiner—Vincent P. McGraw
Assistant Examiner—Michael J. Tokar
Attorney, Agent, or Firm—Homer O. Blair; Robert L. Nathans; William C. Roch

[57] ABSTRACT

A solar energy absorber comprises a conduit having at least one optical amplifier positioned to concentrate the rays of the sun and direct such rays at the conduit. A first terminal portion of the optical amplifier is preferably about ¾ of an inch in width. The light reflective walls of the amplifier converge so that the second terminal portion of the amplifier has a width of about ⅜ of an inch and is positioned adjacent the conduit which has a width of about ⅜ of an inch. The amplifier and conduit are surrounded by a solid thermal insulating material and the result is a solar energy absorber having a high solar transmission, very low thermal losses, and which is capable of efficiently maintaining temperatures within the conduit of as high as 1,000°F.

12 Claims, 2 Drawing Figures

PATENTED MAR 4 1975   3,869,199

SOLAR ENERGY ABSORBER

BACKGROUND OF THE INVENTION

This invention relates to the field of the collection of solar energy for the purpose of heating a liquid contained within a conduit which in turn may be employed for the generation of electric power.

Numerous devices have been proposed in the past for the collection of solar energy. It is of the utmost importance in the coming years to be able to fabricate solar energy absorbers which are relatively inexpensive to manufacture and have a high degree of thermal efficiency. Such absorbers may be positioned within solar "farms" in the desert, for example, for the generation of electric power. These absorbers may also be positioned on the top of buildings in order to conserve fuel oil, gas, etc.

SUMMARY OF THE INVENTION

In accordance with a preferred embodiment of the present invention, an optical amplifier is provided consisting of a pair of wall elements having reflective coatings thereon, said wall elements converging from a first terminal portion which receives concentrated solar energy to a second terminal portion which is positioned adjacent a conduit containing fluid to be heated. The first terminal portion has a light transmissive window, enclosing dead air within the amplifier. The width of the first terminal portion is preferably about ¾ of an inch and the width of the second terminal portion is preferably about ⅜ of an inch. These dimensions provide further effective solar energy amplification and yet prevent convection currents of air within the amplifier which would otherwise cause excessive thermal loss.

Other objects, features and advantages of the present invention will become apparent upon the perusal of the specific description taken in conjunction with the drawings in which.

SPECIFIC DESCRIPTION

Figure 1:
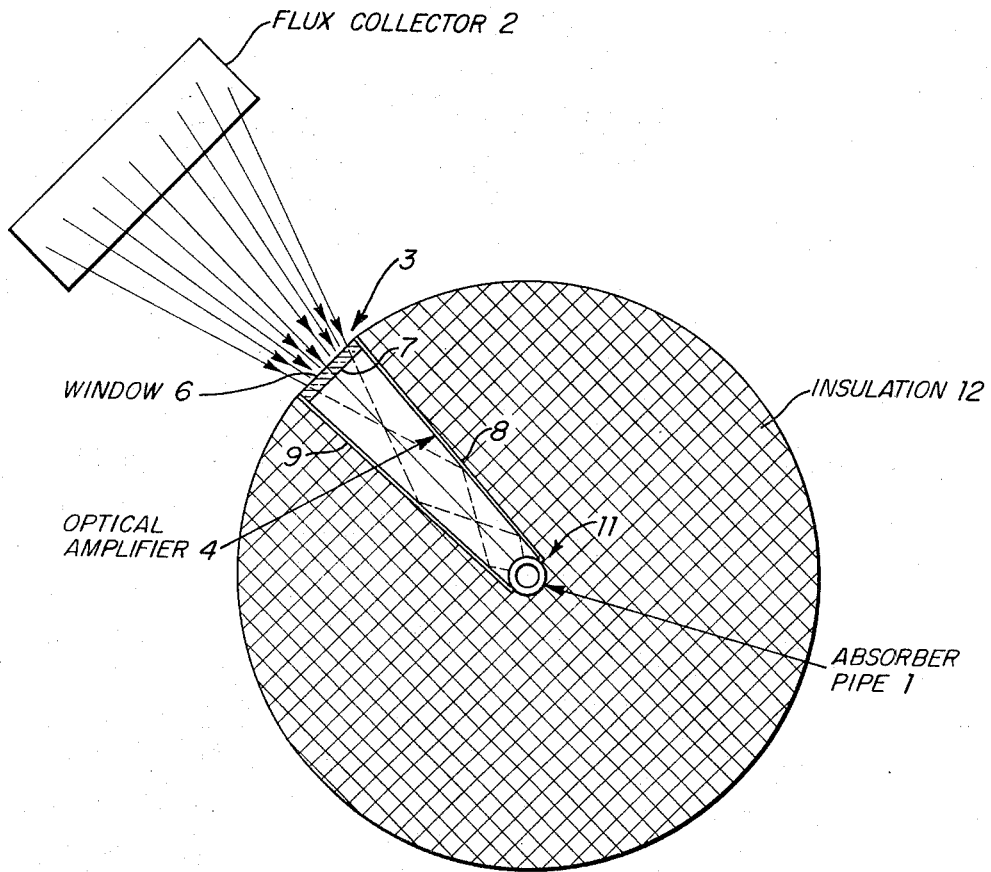
FIG. 1 illustrates a cross section of a preferred solar energy absorber.

In FIG. 1, an absorber pipe is illustrated. A flux collector 2 concentrates the rays of the sun and directs them at a first terminal portion 3 of the optical amplifier 4. A window element 6 is positioned over first terminal portion 3 and comprises a light transmissive material, such as glass, having an antireflective coating 7 coating the inside surface of the window. Wall elements 8 and 9 converge in a direction extending from the first terminal portion 3 toward the second terminal portion 11 which has a width preferably substantially equal to the width or diameter of absorber conduit or pipe 1. The pipe and optical amplifier are preferably surrounded by solid insulating material 12.

Flux collector 2 may comprise curved mirrors, lenses or other well-known devices for concentrating the rays of the sun, which rays converge and are directed at window 7. The rays are further concentrated by the convergence of optical amplifier 4 as they rebound off of the reflective inside surfaces of the wall elements 8 and 9 and cause the fluid within pipe 11 to be heated to extremely high temperatures.

It is preferred that the width of the first terminal portion does not exceed ⅞ of an inch and that the width of the second terminal portion does not exceed ½ of an inch and that the diameter of the pipe is substantially equal to the width of the second terminal portion. If the second terminal portion is considerably smaller than ⅜ of an inch, insufficient thermal energy will be absorbed and if the width of the second terminal portion is much greater than ⅜ of an inch, convection currents will be set up within the body of air within the amplifier and unacceptable heat losses will occur. If the width of the first terminal portion is about equal to the width of the second terminal portion so that the wall elements are parallel, no convection occurs but the degree of amplification is reduced. On the other hand if the width of the first terminal portion is increased considerably beyond ⅞ of an inch, the degree of convergence of the wall elements is too great and the input rays "turn around" and insufficient energy is introduced into the pipe. Thus, the width dimensions of the amplifier should be confined to about the above-stated ranges. However, it is greatly preferred that the width of the window be about ¾ of an inch and the width of the second terminal portion adjacent the absorber pipe be about ⅜ of an inch to obtain maximum thermal efficiency.

The length of the element may be a few meters or so for very small scale heating operations and may extend into the kilometer range for solar farm applications.

The amount of solid insulation employed to prevent re-radiation of heat is not particularly critical but it is greatly preferred that the insulation means comprise a solid material because liquids or air create unacceptable heat losses due to conduction therethrough and/or convection currents.

The prototype constructed by the inventor has a configuration shown in FIG. 1 wherein the width of the second terminal portion adjacent absorber pipe 1 was about ⅜ of an inch and the width of the first terminal portion was ¾ of an inch. The length of the optical amplifier was about 3 inches and the window was made of "Pyrex" brand glass. The absorber was 32 inches in length and was tested by electrically heating the pipe to temperatures from 100° to 1,200°F, and an average thermal loss of 8 percent was the result.

Figure 2:
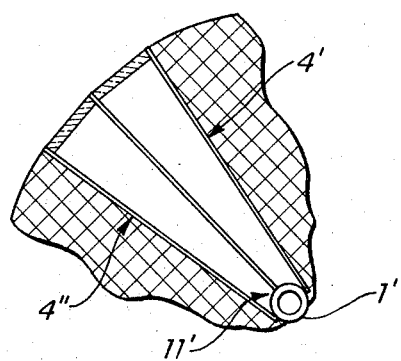
FIG. 2 illustrates an embodiment utilizing two optical amplifiers and a larger diameter conduit.

For certain large scale operations it may be desirable to increase the diameter of the pipe. In FIG. 2 a larger diameter pipe is positioned adjacent the second terminal portions 11' of two optical amplifiers 4' and 4''. It is believed preferable that the diameter of the pipe be roughly equal to the sum of the widths of the second terminal portions of the amplifiers. It is believed feasible to employ a large number of these amplifiers to efficiently conduct solar energy into even larger diameter pipes.

The term "width" of the conduit is intended to include both the diameter of circular pipe and the width of a non-circular pipe such as one having a square cross section. It is believed that temperatures of 1,000°F may be maintained within the absorber pipe by virtue of the above-mentioned structure coacting with state of the art solar flux collectors having acceptable manufacturing costs. Heated fluid would, of course, be pumped through the pipe and employed in a manner notoriously well-known to those skilled in the art.

What is claimed is:

1. A solar energy absorber comprising:
   a. a conduit for containing a fluid to be heated by the sun's rays;

b. at least one elongated optical amplifier for concentrating solar energy directed therethrough having a first terminal portion for receiving solar energy and having a second terminal portion for directing solar energy at said conduit, said optical amplifier comprising a pair of reflective wall elements which converge in a direction from said first terminal portion toward said second terminal portion, the width of said first terminal portion being no greater than about 1½ inches and the width of said second terminal portion being no greater than about ½ of an inch; and c. insulating means of solid insulating material covering at least a portion of said conduit.

2. The combination as set forth in claim 1 wherein the width of said first terminal portion is no greater than about ⅞ of an inch and the width of said second terminal portion is about ⅜ of an inch.

3. The combination as set forth in claim 2 wherein the width of said first terminal portion is about ¾ of an inch.

4. The combination as set forth in claim 3 further including a window covering said first terminal portion having an anti-reflective coating thereon.

5. The combination as set forth in claim 1 wherein the width of said conduit is about equal to the width of said second terminal portion.

6. The combination as set forth in claim 2 wherein the width of said conduit is about ⅜ of an inch.

7. A solar energy absorber comprising:

a. a conduit; and b. a plurality of elongated optical amplifiers positioned adjacent one another for concentrating solar energy directed therethrough, each of said amplifiers having a first terminal portion for receiving solar energy and having a second terminal portion for directing solar energy at said conduit, each amplifier comprising wall elements which converge in a direction from the first terminal portion thereof toward said second terminal portion thereof, the width of each first terminal portion being no greater than about 1½ inches and the width of each second terminal portion being no greater than about ½ of an inch.

8. The combination as set forth in claim 7 wherein the sum of the widths of the second terminal portions of said plurality of optical amplifiers are substantially equal to the widths of said conduit.

9. The combination as set forth in claim 8 wherein at least certain of said wall elements reflect solar energy.

10. The combination as set forth in claim 7 wherein the width of the first terminal portion of each amplifier is about ¾ of an inch and the width of the second terminal portion of each amplifier is about ⅜ of an inch.

11. The combination as set forth in claim 8 wherein the width of the first terminal portion of each amplifier is about ¾ of an inch and the width of the second terminal portion of each amplifier is about ⅜ of an inch.

12. The combination as set forth in claim 9 wherein the width of the first terminal portion of each amplifier is about ¾ of an inch and the width of the second terminal portion of each amplifier is about ⅜ of an inch.

* * * * *